US012290150B2

United States Patent
Sudo et al.

(10) Patent No.: US 12,290,150 B2
(45) Date of Patent: May 6, 2025

(54) STUD FOR OUTSOLE, OUTSOLE FOR CLEATED SHOE, METHOD FOR PRODUCING OUTSOLE, AND CLEATED SHOE

(71) Applicant: MIZUNO CORPORATION, Osaka (JP)

(72) Inventors: Shingo Sudo, Osaka (JP); Yohei Yoshida, Osaka (JP)

(73) Assignee: MIZUNO CORPORATION, Osaka (JP)

( * ) Notice: Subject to any disclaimer, the term of this patent is extended or adjusted under 35 U.S.C. 154(b) by 29 days.

(21) Appl. No.: 18/119,368

(22) Filed: Mar. 9, 2023

(65) Prior Publication Data
US 2023/0284749 A1    Sep. 14, 2023

(30) Foreign Application Priority Data

Mar. 10, 2022  (JP) .................................. 2022-037011

(51) Int. Cl.
| | |
|---|---|
| A43C 15/16 | (2006.01) |
| A43B 5/02 | (2006.01) |
| B29D 35/00 | (2010.01) |
| B29D 35/12 | (2010.01) |

(52) U.S. Cl.
CPC .............. *A43C 15/161* (2013.01); *A43B 5/02* (2013.01); *A43C 15/167* (2013.01); *B29D 35/0009* (2013.01); *B29D 35/122* (2013.01)

(58) Field of Classification Search
CPC ..... A43C 15/16; A43C 15/162; A43C 15/161; A43B 13/26
See application file for complete search history.

(56) References Cited

U.S. PATENT DOCUMENTS

| | | | | |
|---|---|---|---|---|
| 5,657,556 | A | * | 8/1997 | Bemis ................... A43C 15/161 12/142 P |
| 5,832,636 | A | * | 11/1998 | Lyden .................... A43B 13/26 36/134 |
| 6,367,167 | B1 | * | 4/2002 | Krstic ...................... A43B 5/02 428/421 |
| 2002/0174571 | A1 | * | 11/2002 | Briant ..................... A43B 13/26 36/134 |
| 2006/0021254 | A1 | * | 2/2006 | Jones ..................... A43C 15/14 36/61 |
| 2009/0293315 | A1 | * | 12/2009 | Auger ...................... A43B 5/02 36/114 |
| 2010/0107450 | A1 | * | 5/2010 | Locke .................... A43C 15/02 36/62 |

(Continued)

FOREIGN PATENT DOCUMENTS

JP    2017-113314 A    6/2017

*Primary Examiner* — Jillian K Pierorazio
(74) *Attorney, Agent, or Firm* — TROUTMAN PEPPER LOCKE LLP; James E. Schutz; Korbin M. Blunck

(57) ABSTRACT

A stud for an outsole includes: an outer tubular portion located on an outsole body and having a tubular shape; and a core portion located inside the outer tubular portion. The outer tubular portion is integral with the outsole body with no seam between the outer tubular portion and the outsole body. An inner wall surface of the outer tubular portion surrounds, and is in contact with, a side surface of the core portion. This configuration reduces separation of the stud from the outsole and firmly holds the stud on the outsole.

9 Claims, 10 Drawing Sheets

(56) References Cited

U.S. PATENT DOCUMENTS

| | | | | |
|---|---|---|---|---|
| 2012/0210608 A1* | 8/2012 | Baker | ................... | A43C 15/14 |
| | | | | 36/134 |
| 2013/0340295 A1* | 12/2013 | Adami | ................... | A43B 13/04 |
| | | | | 12/146 B |
| 2014/0345166 A1* | 11/2014 | Koch | ................... | A43C 15/162 |
| | | | | 36/134 |
| 2018/0125169 A1* | 5/2018 | Hirai | ................... | A43C 15/161 |
| 2018/0140042 A1* | 5/2018 | Adami | ................... | A43C 15/16 |
| 2018/0343979 A1* | 12/2018 | Yoshida | ............... | A43C 15/02 |
| 2020/0281306 A1* | 9/2020 | Shimizu | ............... | B29D 35/122 |
| 2021/0321722 A1* | 10/2021 | Chechile | .............. | A43C 15/162 |

\* cited by examiner

STUD FOR OUTSOLE, OUTSOLE FOR CLEATED SHOE, METHOD FOR PRODUCING OUTSOLE, AND CLEATED SHOE

CROSS-REFERENCE TO RELATED APPLICATION

This application claims priority to Japanese Patent Application No. 2022-037011 filed on Mar. 10, 2022, the entire disclosure of which is incorporated by reference herein.

BACKGROUND

The present disclosure relates to studs for outsoles, outsoles for cleated shoes, methods for producing an outsole, and cleated shoes.

For example, a stud for an outsole as described in Japanese Unexamined Patent Publication No. 2017-11314 is conventionally known as a stud for an outsole for a cleated shoe.

In Japanese Unexamined Patent Publication No. 2017-11314, a plurality of studs (first and second studs) is provided on an outsole (first outsole portion) for a cleated shoe. Each of the studs is configured as a separate member made of a different material from the outsole. The studs are bonded to the bottom of the outsole.

SUMMARY

In the configuration described in Japanese Unexamined Patent Publication No. 2017-11314, there is a seam at the joint between each stud and the outsole (see FIGS. 1 and 9 of Japanese Unexamined Patent Publication No. 2017-11314). That is, in this configuration, the stud is not continuous with the outsole. Accordingly, when a continuous load is applied to the stud by various motions made by a person wearing cleated shoes (hereinafter referred to as "wearer") while playing a sport (e.g., walking, running, kicking a ball, stopping suddenly, turning back, jumping, and landing by the wearer), the stud may start separating from the outsole at the seam. Moreover, when the bonding at the seam becomes unstable due to the continuous load, it is sometimes difficult to firmly hold the stud on the outsole. Under such circumstances, it is desired to improve the conventional studs so as to prevent or reduce separation of the studs from the outsole and to firmly hold the studs on the outsole.

The present disclosure was made in view of the above, and it is an object of the present disclosure to reduce separation of studs from an outsole and to firmly hold the studs on the outsole.

In order to achieve the above object, a first disclosure relates to a stud for an outsole for a cleated shoe. The stud includes: an outer tubular portion located on the outsole and having a tubular shape; and a core portion located inside the outer tubular portion. The outer tubular portion is integral with the outsole with no seam between the outer tubular portion and the outsole. An inner wall surface of the outer tubular portion surrounds, and is in contact with, a side surface of the core portion.

In the first disclosure, the outer tubular portion is formed integrally with the outsole such that there is no seam therebetween. That is, in the stud according to the first disclosure, the outer tubular portion is continuous with the outsole. Therefore, even when a continuous load is applied to the stud by various motions made by a wearer of the cleated shoes while playing a sport, the stud is less likely to be separated from the outsole because there is no such seam on the outside that the outer tubular portion may start separating from the outsole at. In the first disclosure, the outer tubular portion is also configured so that its inner wall surface surrounds, and is in contact with, the side surface of the core portion. With this configuration, the core portion surrounded by the inner wall surface of the outer tubular portion increases the strength of the stud. Moreover, the core portion is restrained from slipping out of the outer tubular portion due to the resistance (e.g., frictional force) generated by the contact between the inner wall surface of the outer tubular portion and the side surface of the core portion. As a result, the core portion is kept surrounded by the inner wall surface of the outer tubular portion. That is, the stud becomes stable with respect to the outsole body. Therefore, in the first disclosure, separation of the stud from the outsole can be reduced, and the stud can be held firmly on the outsole.

According to a second disclosure, in the first disclosure, the core portion includes a retaining structure that restrains the core portion from slipping out of the outer tubular portion.

In the second disclosure, the core portion is less likely to slip out of the outer tubular portion due to the retaining structure. The stud thus becomes more stable with respect to the outsole.

According to a third disclosure, in the first disclosure, each of the outer tubular portion and the core portion is made of a resin material, and the inner wall surface of the outer tubular portion and the side surface of the core portion are fused to each other.

In the third disclosure, since the inner wall surface of the outer tubular portion and the side surface of the core portion are fused to each other, the core portion is firmly fixed to the outer tubular portion. That is, the core portion is less likely to slip out of the outer tubular portion. Accordingly, in the second disclosure, the stud becomes even more stable with respect to the outsole.

According to a fourth disclosure, in the first disclosure, the outer tubular portion has a smallest thickness at its lower end.

In the fourth disclosure, when forming the outer tubular portion by, for example, injection molding, a heated and melted resin material can more easily flow toward the lower end of the outer tubular portion in a mold device. As a result, phenomena such as sink marks are less likely to occur in the outer tubular portion, and the outer tubular portion becomes structurally stable.

According to a fifth disclosure, in the first disclosure, a lower end of the core portion is exposed from a lower end of the outer tubular portion.

In the fifth disclosure, both the outer tubular portion and the core portion are visible when viewed from the lower end side of the outer tubular portion (i.e., from the side of the stud that contacts the ground). Accordingly, the design of the stud can be improved by, for example, changing the colors of the outer tubular portion and core portion as appropriate.

According to a sixth disclosure, in the first disclosure, the core portion includes a mold installation structure that is used to place the core portion in a mold device for producing the outsole. The mold installation structure includes a first recess located in an upper part of the core portion, and a second recess located in a lower part of the core portion.

In the sixth disclosure, the core portion can be stably placed in the mold device by using the mold installation structure (first and second recesses) of the core portion in, for example, an insert process that is performed when producing the outsole.

A seventh disclosure is an outsole for a cleated shoe including at least one of the studs of the first disclosure.

In the seventh disclosure, the outsole for a cleated shoe having functions and effects similar to those of the first disclosure can be obtained.

According to an eighth disclosure, in the seventh disclosure, the outsole further includes an outsole body, the stud is located on a bottom of the outsole body, and the outer tubular portion is integral with the outsole body with no seam between the outer tubular portion and the outsole body.

In the eighth disclosure, the outer tubular portion is formed integrally with the outsole body such that there is no seam therebetween. Therefore, as in the first disclosure, separation of the stud from the outsole body can be reduced.

A ninth disclosure is a method for producing the outsole of the eight disclosure. The method includes molding the stud together with the outsole body by injection molding.

In the ninth disclosure, the outsole for a cleated shoe that reduces separation of the stud from the outsole body can be stably obtained.

A tenth disclosure is a cleated shoe including the outsole of the seventh or eighth disclosure.

In the tenth disclosure, the stud on the outsole body provides an enhanced grip on the ground, and improves stability when contacting the ground.

As described above, according to the present disclosure, separation of the stud from the outsole can be reduced, and the stud can be firmly held on the outsole.

DETAILED DESCRIPTION

Hereinafter, embodiments of the present disclosure will be described in detail with reference to the accompanying drawings. The following description of the embodiments is merely illustrative in nature and is not intended to limit the present disclosure, its applications or uses.

FIGS. 1 to 5 show an outsole 1 for a cleated shoe according to an embodiment of the present disclosure. A cleated shoe with this outsole 1 is used for sports that require explosive movements, such as soccer, rugby, American football, and baseball.

The outsole 1 illustrated in the embodiment of the present disclosure is an outsole for a left shoe. An outsole for a right shoe is configured symmetrically with the outsole for a left shoe. Only the outsole for a left shoe will be described below, and description of the outsole for a right shoe will be omitted.

In the following description and the figures, the terms "upper," "top," "lower," and "bottom" indicate relative positions in the vertical direction of the outsole 1, the terms "front" and "rear" indicate relative positions in the foot length direction (front-rear direction) of the outsole 1, and the terms "medial side" and "lateral side" indicate relative positions in the foot width direction of the outsole 1.

Outsole Body

As shown in FIGS. 1 to 6, the outsole 1 includes an outsole body 2. The outsole body 2 is made of, for example, a resin material with high wear resistance. Specific examples of the material suitable for the outsole body 2 include nylon elastomers, thermoplastic polyurethanes, styrene thermoplastic elastomers, and polyamide thermoplastic elastomers. An upper, not shown, is fixed to the peripheral edge portion of the outsole body 2.

The upper surface of the outsole body 2 is configured as a sole support surface 3 for supporting the sole of a wearer's foot. The sole support surface 3 may be configured to directly support the sole of the wearer's foot, or may be configured to support the sole of the wearer's foot with an insole, not shown, etc. therebetween.

Figure 1:
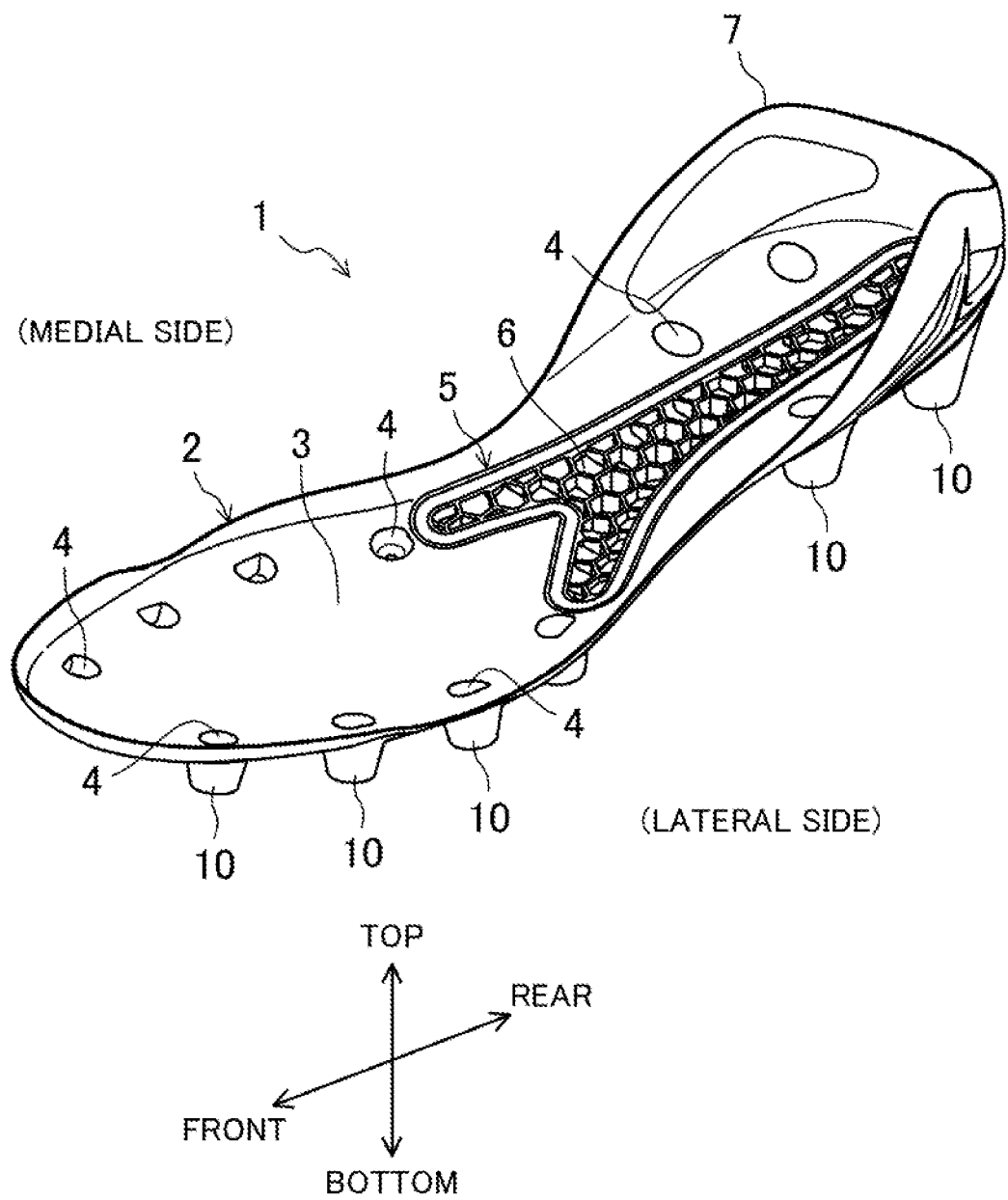
FIG. 1 is a perspective view of an outsole according to an embodiment of the present disclosure as viewed from above.
Figure 3:
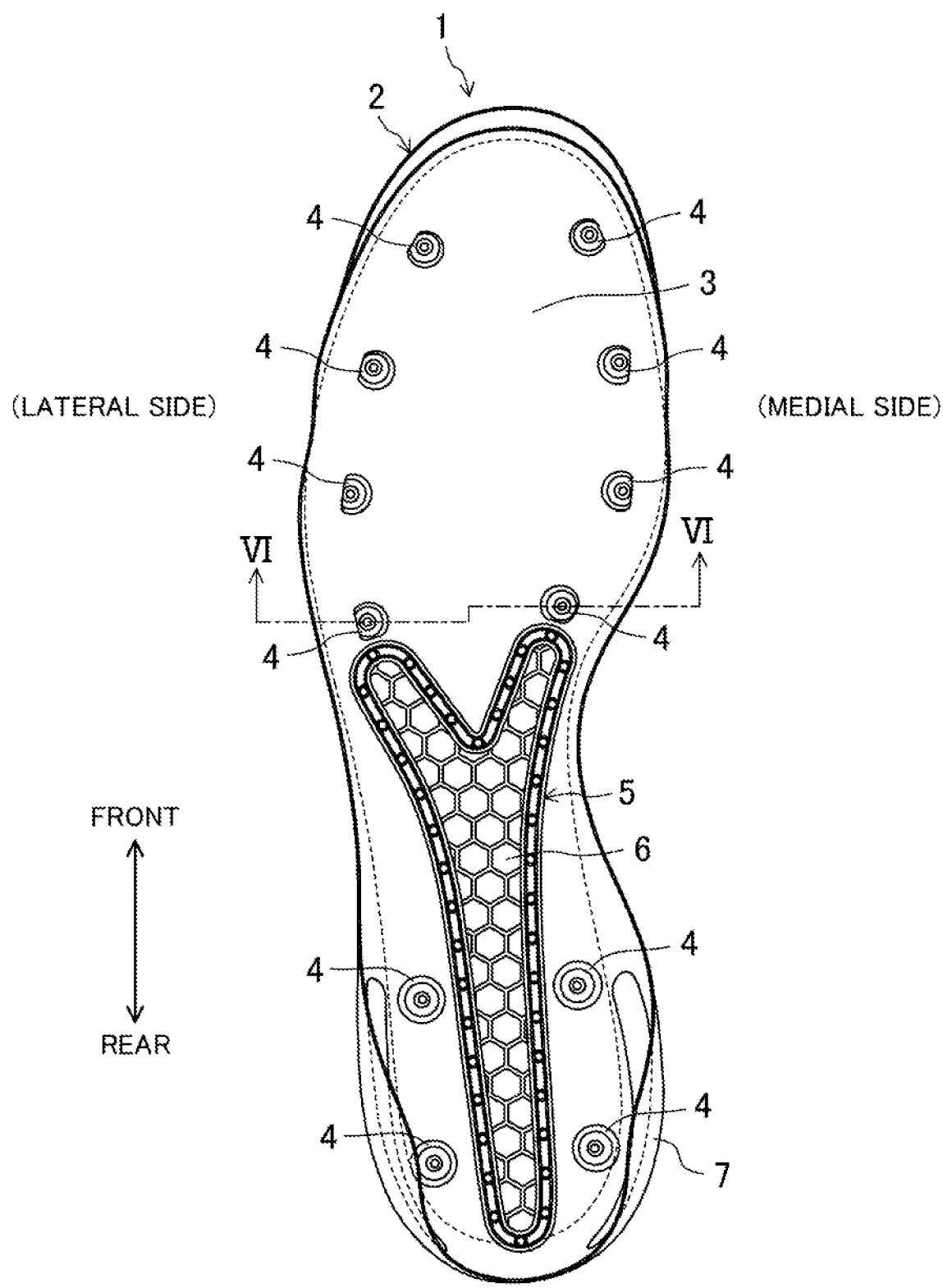
FIG. 3 is a plan view of the outsole shown in FIG. 1.

As shown in FIGS. 1 and 3, the outsole body 2 has a plurality of round holes 4. The round holes 4 have a substantially circular shape in plan. The round holes 4 extend through the outsole body 2 from the sole support surface 3 to the bottom of the outsole body 2 (see FIGS. 6 and 7). The round holes 4 communicate with inner holes 13, which will be described later, in the vertical direction.

The outsole body 2 has a reinforcing portion 5. The reinforcing portion 5 is made of a hard resin material having higher rigidity than the outsole body 2. Specifically, the reinforcing portion 5 is made of, for example, fiber-reinforced plastic (FRP), glass fiber-containing nylon, or carbon fiber-reinforced plastic (CFRP). The reinforcing portion 5 is located on the outsole body 2 at a position corresponding to the area from the midfoot to hindfoot of the wearer's foot. The upper surface of the reinforcing portion 5 is substantially flush with the sole support surface 3 of the outsole body 2.

The reinforcing portion 5 has a honeycomb structure 6. The honeycomb structure 6 is composed of a plurality of recesses each having a regular hexagonal shape. The honeycomb structure 6 increases the rigidity of the part of the outsole body 2 that corresponds to the area from the midfoot to hindfoot of the wearer's foot.

As shown in FIGS. 1 to 3 and 5, the outsole body 2 has a counter portion 7. The counter portion 7 is located on the outsole body 2 at a position corresponding to the heel of the wearer's foot. The counter portion 7 is configured to cover both sides and back of the heel of the wearer's foot.

Figure 2:
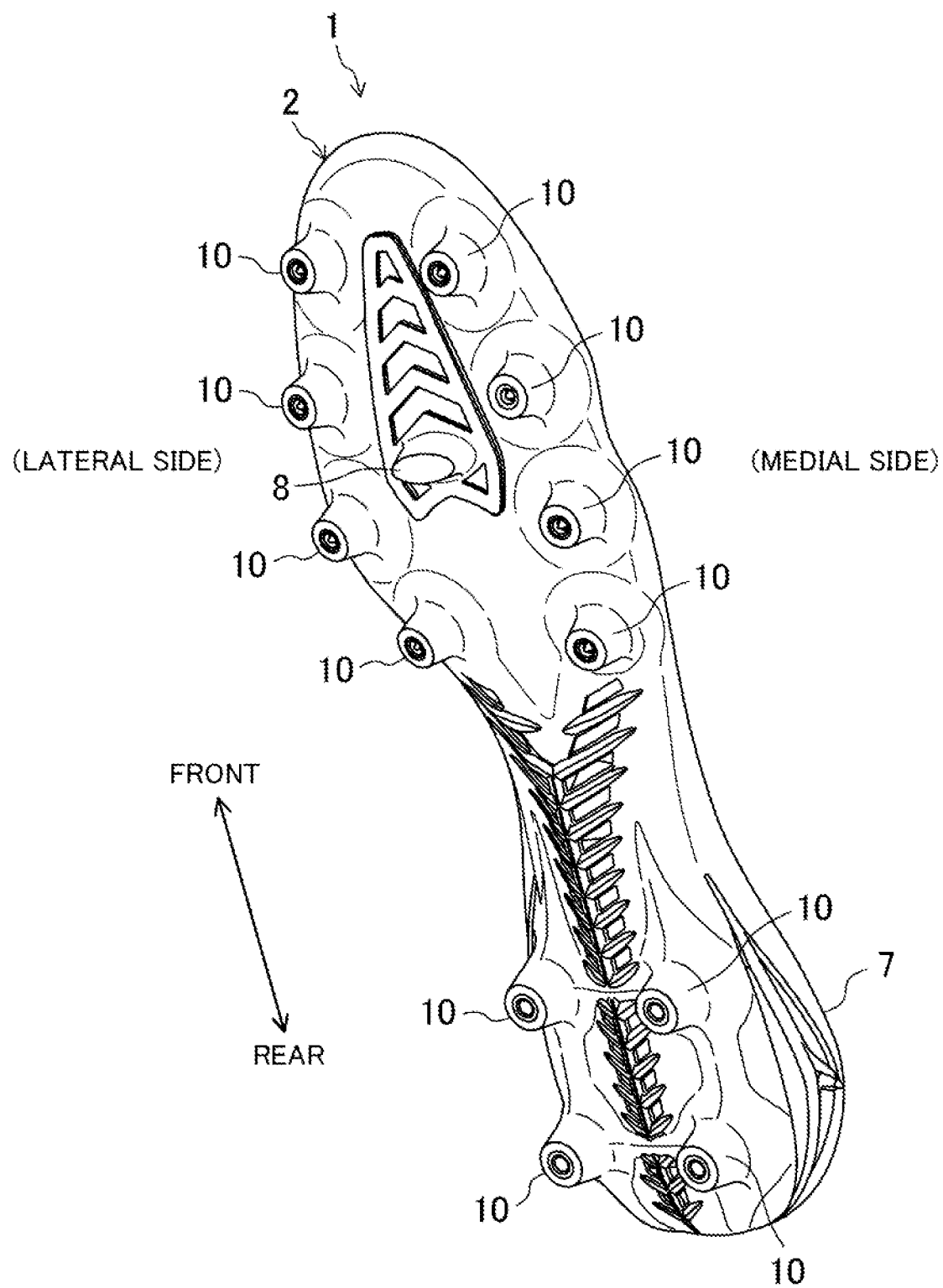
FIG. 2 is a perspective view of the outsole shown in FIG. 1 as viewed from below.
Figure 4:
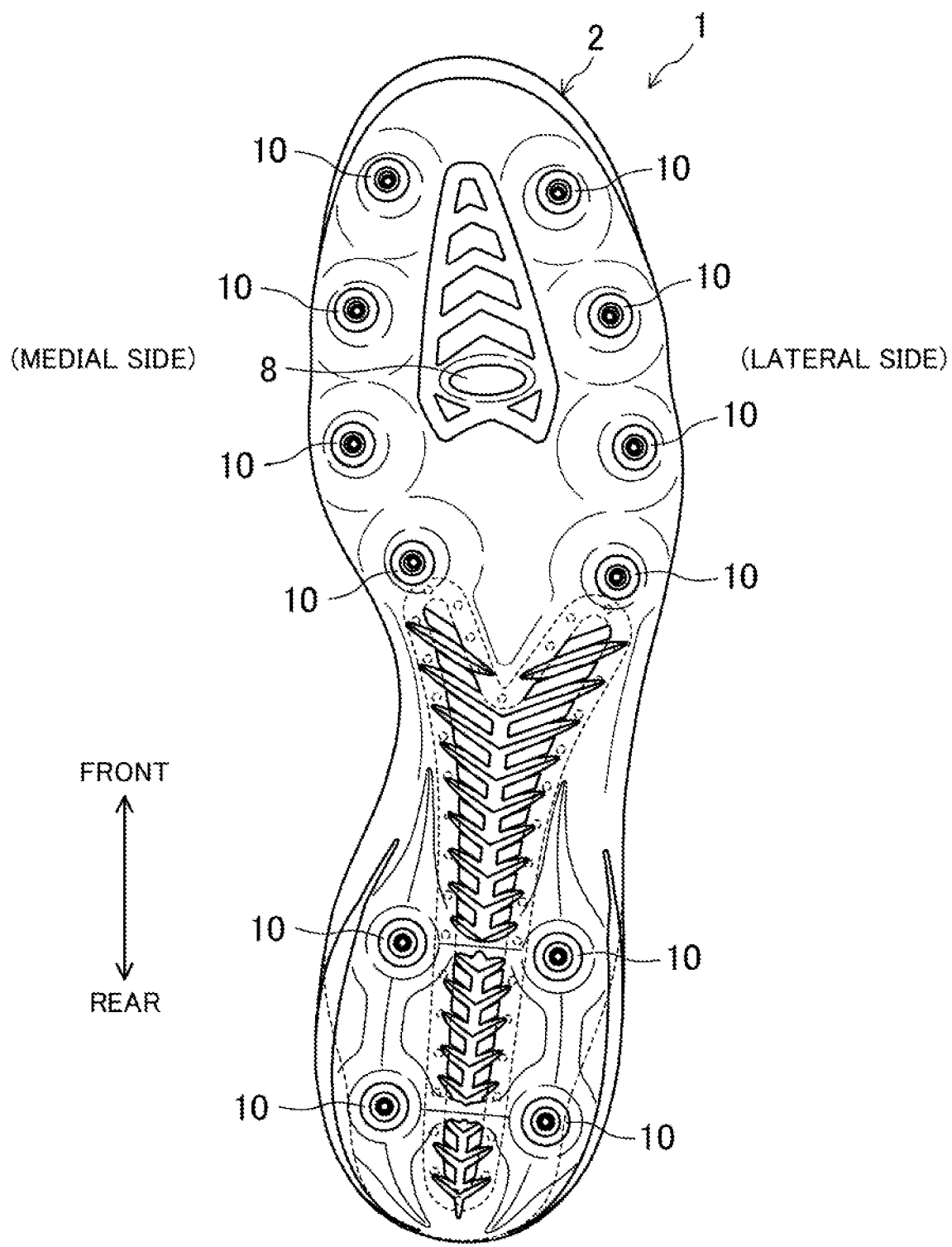
FIG. 4 is a bottom view of the outsole shown in FIG. 1.
Figure 5:
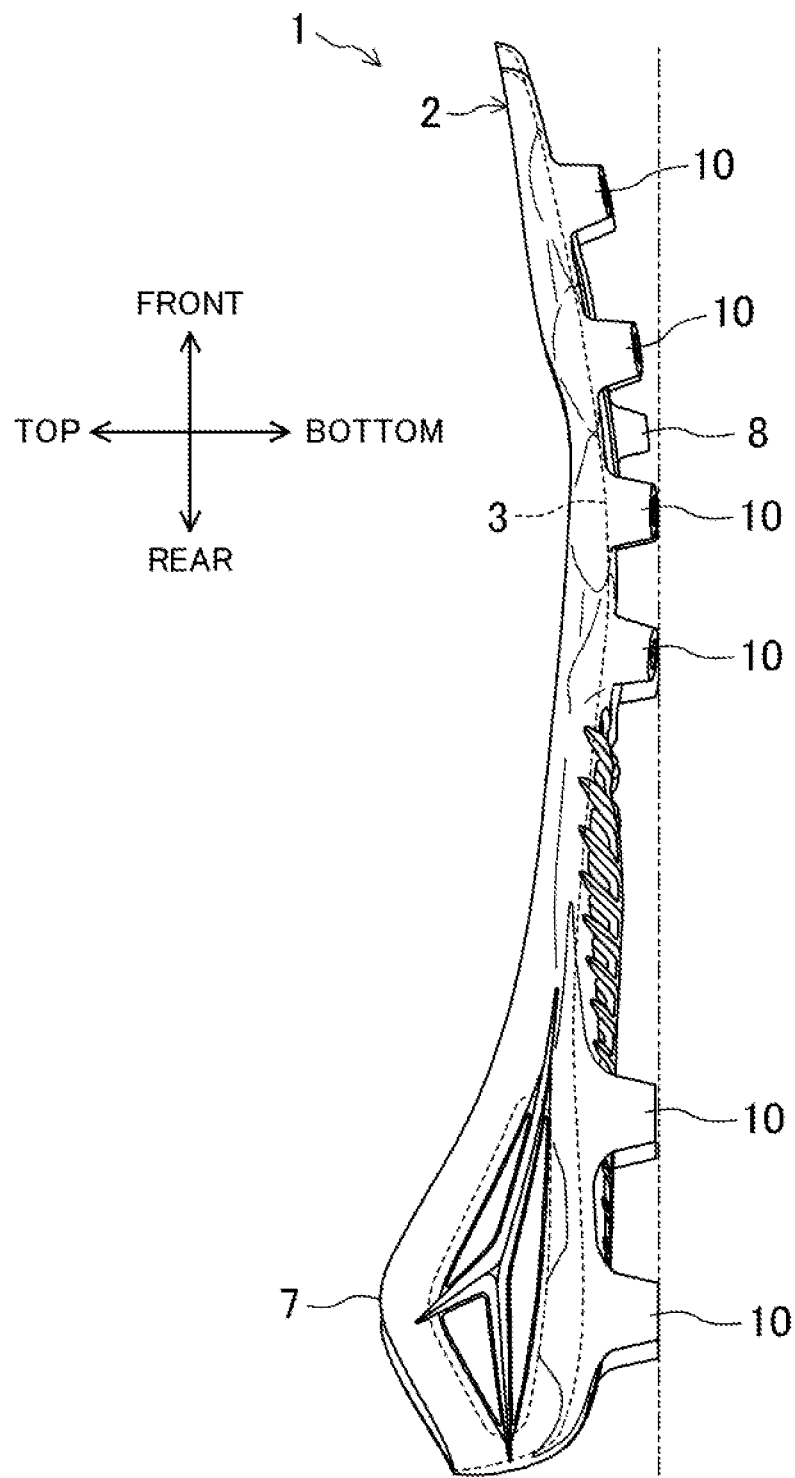
FIG. 5 is a side view of the outsole shown in FIG. 1 as viewed from the lateral side.

As shown in FIGS. 2 and 4, a middle stud 8 is provided on the bottom of the outsole body 2. The middle stud 8 is made of, for example, a resin material with high wear resistance. Examples of the material suitable for the middle stud 8 include nylon elastomers, thermoplastic polyurethanes, styrene thermoplastic elastomers, and polyamide thermoplastic elastomers. The middle stud 8 is located on the bottom of the outsole body 2 at a position corresponding to the wearer's forefoot.

Stud

As shown in FIGS. 1 and 2, the outsole 1 has a plurality of studs 10 (12 studs in the illustrated example). The studs 10 are elements for providing the cleated shoe with an enhanced grip on the ground when contacting the ground. The studs 10 are molded together with the outsole body 2 by, for example, injection molding.

As shown in FIGS. 2 and 4, the studs 10 are arranged dispersedly on the bottom of the outsole body 2. The studs 10 are positioned so as to be aligned with the round holes 4 in the vertical direction.

The studs 10 are located on the outsole body 2 at positions corresponding to the wearer's forefoot and hindfoot. Specifically, the studs 10 are located at positions near the medial and lateral sides of the outsole body 2. The studs 10 located near the medial side of the outsole body 2 are spaced apart from each other in the foot length direction. The studs 10 located near the lateral side of the outsole body 2 are spaced apart from each other in the foot length direction.

Figure 6:
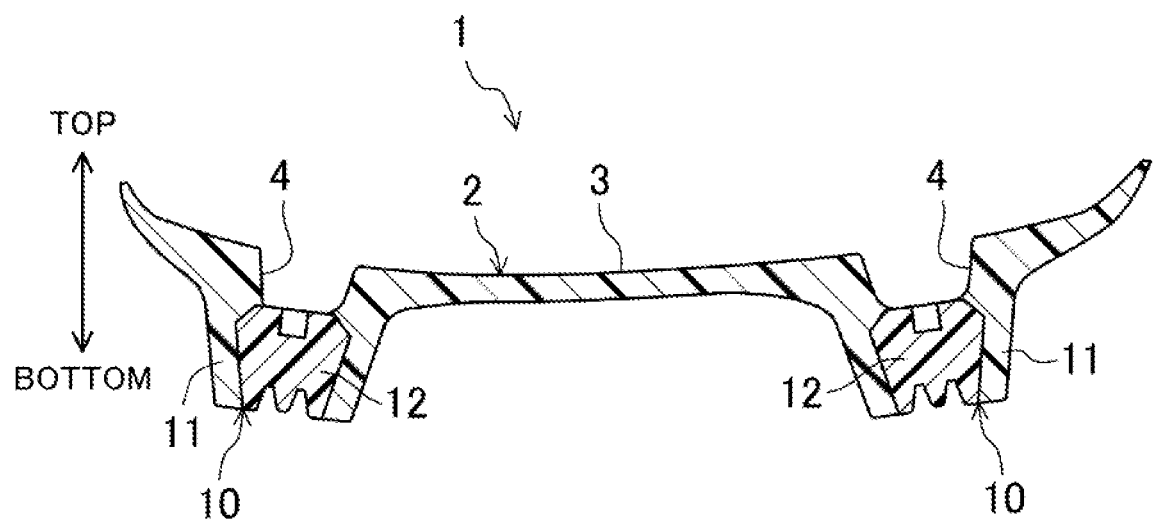
FIG. 6 is a sectional view taken along line VI-VI in FIG. 3.
Figure 7:
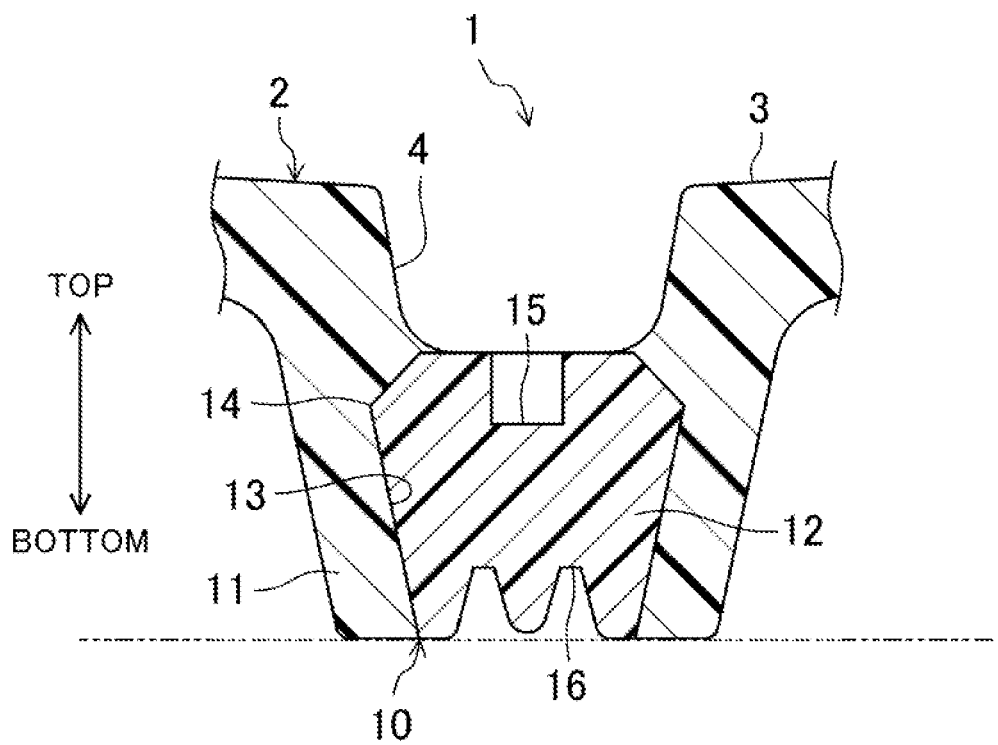
FIG. 7 is a partial enlarged view illustrating the configuration of a stud shown in FIG. 6.

As shown in FIGS. 6 and 7, each stud 10 has an outer tubular portion 11 and a core portion 12.

The outer tubular portion 11 is made of the same resin material as the outsole body 2. The outer tubular portion 11 has a tubular shape extending downward from the bottom of the outsole body 2. The outer tubular portion 11 of the present embodiment has a substantially cylindrical shape.

The outer tubular portion 11 is configured so that its lower end contacts the ground. The outer tubular portion 11 is tapered downward from its root portion located at the bottom of the outsole body 2. In the present embodiment, the thickness of the outer tubular portion 11 is substantially constant from the position corresponding to a corner 14, which will be described later, to the lower end of the outer tubular portion 11. As a characteristic configuration of the present disclosure, the outer tubular portion 11 is formed integrally with the outsole body 2 such that there is no seam therebetween.

As shown in FIG. 7, the outer tubular portion 11 has an inner hole 13. The inner hole 13 is formed so as to extend through the outer tubular portion 11 in the vertical direction. The inner hole 13 communicates with a corresponding round hole 4 of the outsole body 2. The inner hole 13 has a substantially barrel shape in vertical section. That is, the inner hole 13 is formed so as to fit the outer shape of the core portion 12.

The core portion 12 of the present embodiment is made of a resin material. Specifically, the core portion 12 is made of a resin material with high wear resistance. Examples of the resin material suitable for the core portion 12 include nylon elastomers, thermoplastic polyurethanes, styrene thermoplastic elastomers, and polyamide thermoplastic elastomers. In particular, styrene thermoplastic elastomers have wear resistance and are relatively lightweight compared to other materials. Therefore, the use of a styrene thermoplastic elastomer as the material for the core portion 12 can reduce the weight of the core portion 12, and can thus achieve a reduction in overall weight of the outsole 1.

The core portion 12 is located inside the outer tubular portion 11. Specifically, the core portion 12 is located in the inner hole 13 of the outer tubular portion 11. As a characteristic configuration of the present disclosure, the outer tubular portion 11 is configured such that its inner wall surface surrounds, and is in contact with, the side surface of the core portion 12. Particularly in the present embodiment, the outer tubular portion 11 and the core portion 12 are both made of a resin material, and the inner wall surface of the outer tubular portion 11 and the side surface of the core portion 12 are fused to each other through an injection molding process that will be described later. The core portion 12 is configured such that its lower end is exposed from the lower end of the outer tubular portion 11. In the present embodiment, the inner wall surface of the outer tubular portion 11 is configured to surround the entire side surface of the core portion 12.

The core portion 12 has a substantially barrel shape in vertical section. Specifically, as shown in FIG. 7, the core portion 12 has the corner 14. The corner 14 is located near the upper end of the core portion 12. The core portion 12 has the largest radial size at the position of the corner 14. The core portion 12 is formed such that its radial size gradually decreases upward and downward from the corner 14. With the core portion 12 fitted in the inner hole 13, the corner 14 is stopped by the inner wall surface of the outer tubular portion 11. The core portion 12 is thus restrained from slipping out of the outer tubular portion 11. That is, in the stud 10 of the present embodiment, the corner 14 corresponds to the retaining structure that restrains the core portion 12 from slipping out of the outer tubular portion 11.

As shown in FIG. 7, the core portion 12 has a first recess 15 and a second recess 16. The first recess 15 is formed in the upper part of the core portion 12. The second recess 16 is formed in the lower part of the core portion 12. The first recess 15 and the second recess 16 serve as a mold installation structure that is used to place the core portion 12 in a mold device 30 (see FIG. 8) for producing the outsole 1.

Method for Producing Outsole

Figure 8:
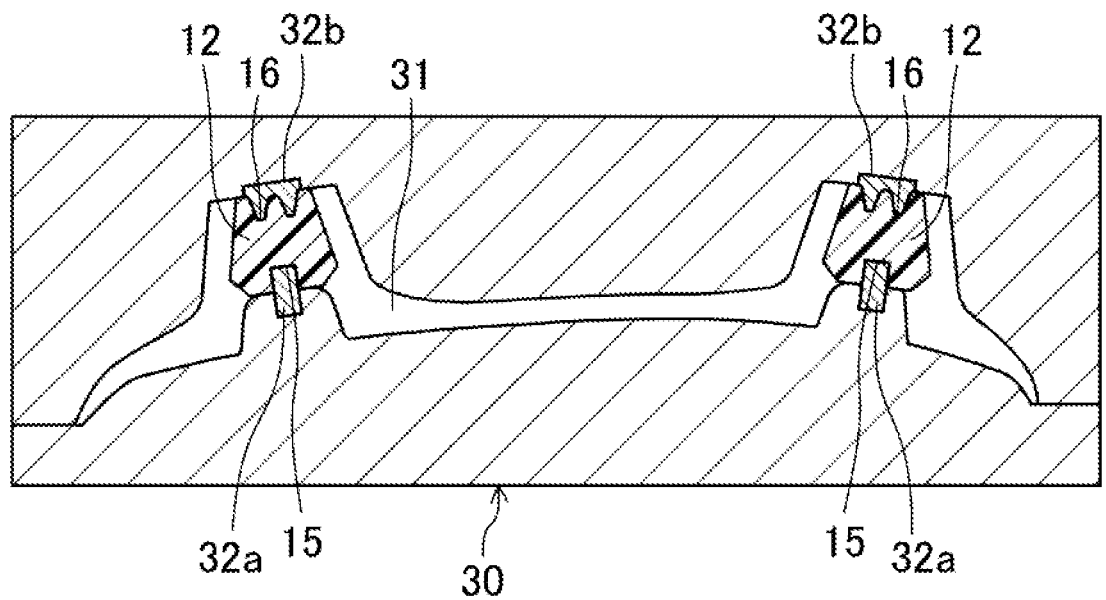
FIG. 8 schematically shows a sectional structure of a mold device for producing the outsole.

Next, a method for producing the outsole 1 will be described with reference to FIG. 8. This method mainly includes an insert process and an injection molding process. In FIG. 8, the position corresponding to the upper surface of the outsole body 2 is shown located on the lower side in FIG. 8 in consideration of the actual form of production. FIG. 8 shows the state before a mold cavity 31 of the mold device 30 is filled with a resin material for the outsole body 2 and the outer tubular portions 11. In the following description, description of the reinforcing portion 5 and the middle stud 8 will be omitted.

In the insert process, the plurality of core portions 12 is placed at predetermined positions in the mold device 30 for the outsole 1. Specifically, a plurality of first pins 32*a* and a plurality of second pins 32*b* are placed in advance at predetermined positions in the mold cavity 31 of the mold device 30. Then, the first recesses 15 of the core portions 12 are aligned with the first pins 32*a*, and the second recesses 16 of the core portions 12 are aligned with the second pins 32*b*. The core portions 12 are thus placed at the predetermined positions in the mold device 30.

The injection molding process is performed after the insert process. In the injection molding process, the mold device 30 is filled with a heated and melted resin material (i.e., resin material for the outsole body 2 and the outer tubular portions 11) by an injection molding machine, not shown. At this time, the resin material is injected into the mold cavity 31 of the mold device 30 through gates, not shown, of the mold device 30. Specifically, the resin material is injected into the mold cavity 31 of the mold device 30 from the position corresponding to the sole support surface 3 of the outsole body 2 toward the positions corresponding to the outer tubular portions 11.

After the mold cavity 31 of the mold device 30 is filled with the resin material, the mold device 30 is subjected to a predetermined cooling process. The outsole 1 is obtained through this cooling process.

The mold device 30 is also used for production of conventional outsoles (e.g., the outsole described in Japanese Unexamined Patent Publication No. 2017-11314). That is, the mold device 30 can be used for both production of the outsole 1 according to the embodiment of the present disclosure and production of conventional outsoles.

Functions and Effects of Embodiment

In the stud 10 of the outsole 1 according to the embodiment of the present disclosure, the outer tubular portion 11 is formed integrally with the outsole body 2 (outsole 1) such that there is no seam therebetween. That is, the outer tubular portion 11 is continuous with the outsole body 2 (outsole 1). Therefore, even when a continuous load is applied to the stud 10 by various motions made by the wearer of the cleated shoes while playing a sport, the stud 10 is less likely to be separated from the outsole body 2 because there is no such seam on the outside that the outer tubular portion 11 may start separating from the outsole body 2 at. Examples of the motions include walking, running, kicking a ball, stopping suddenly, turning back, jumping, and landing by the wearer. The outer tubular portion 11 is also configured so that its inner wall surface surrounds, and is in contact with, the side surface of the core portion 12. With this configuration, the core portion 12 surrounded by the inner wall surface of the outer tubular portion 11 increases the strength of the stud 10. Moreover, the core portion 12 is restrained from slipping out of the outer tubular portion 11 due to the resistance (e.g., frictional force) generated by the contact between the inner wall surface of the outer tubular portion 11 and the side surface of the core portion 12. As a result, the core portion 12 is kept surrounded by the inner wall surface of the outer tubular portion 11. That is, the stud 10 becomes stable with respect to the outsole body 2. Therefore, according to the stud 10 of the outsole 1 of the embodiment of the present disclosure, separation of the stud 10 from the outsole body 2 (outsole 1) can be reduced, and the stud 10 can be held firmly on the outsole body 2 (outsole 1).

The core portion 12 has the retaining structure. The core portion 12 is less likely to slip out of the outer tubular portion 11 due to the retaining structure. Particularly in the present embodiment, the inner hole 13 of the outer tubular portion 11 and the core portion 12 have a substantially barrel shape in vertical section, and mainly the corner 14 serves as the retaining structure. The core portion 12 is therefore less likely to slip out of the outer tubular portion 11 both upward and downward. The stud 10 thus becomes more stable with respect to the outsole 1.

The outer tubular portion 11 and the core portion 12 are both made of a resin material, and the inner wall surface of the outer tubular portion 11 and the side surface of the core portion 12 are fused to each other. The core portion 12 is therefore firmly fixed to the outer tubular portion 11. That is, the core portion 12 is less likely to slip out of the outer tubular portion 11. The stud 10 thus becomes even more stable with respect to the outsole 1.

Since the lower end of the core portion 12 is exposed from the lower end of the outer tubular portion 11, both the outer tubular portion 11 and the core portion 12 are visible when viewed from the lower end side of the outer tubular portion 11 (i.e., from the side of the stud 10 that contacts the ground). Accordingly, the design of the stud 10 can be improved by, for example, changing the colors of the outer tubular portion 11 and core portion 12 as appropriate.

The core portion 12 has a mold installation structure that is used to place the core portion 12 in the mold device 30. The mold installation structure includes the first recess 15 and the second recess 16. According to this configuration, the core portion 12 can be stably placed in the mold cavity 31 of the mold device 30 by using the mold installation structure (first recess 15 and second recess 16) in, for example, the insert process.

The studs 10 are molded together with the outsole body 2 by injection molding. It is therefore possible to stably obtain the outsole 1 that reduces separation of the stud 10 from the outsole body 2.

Modifications of Embodiment

Figure 9:
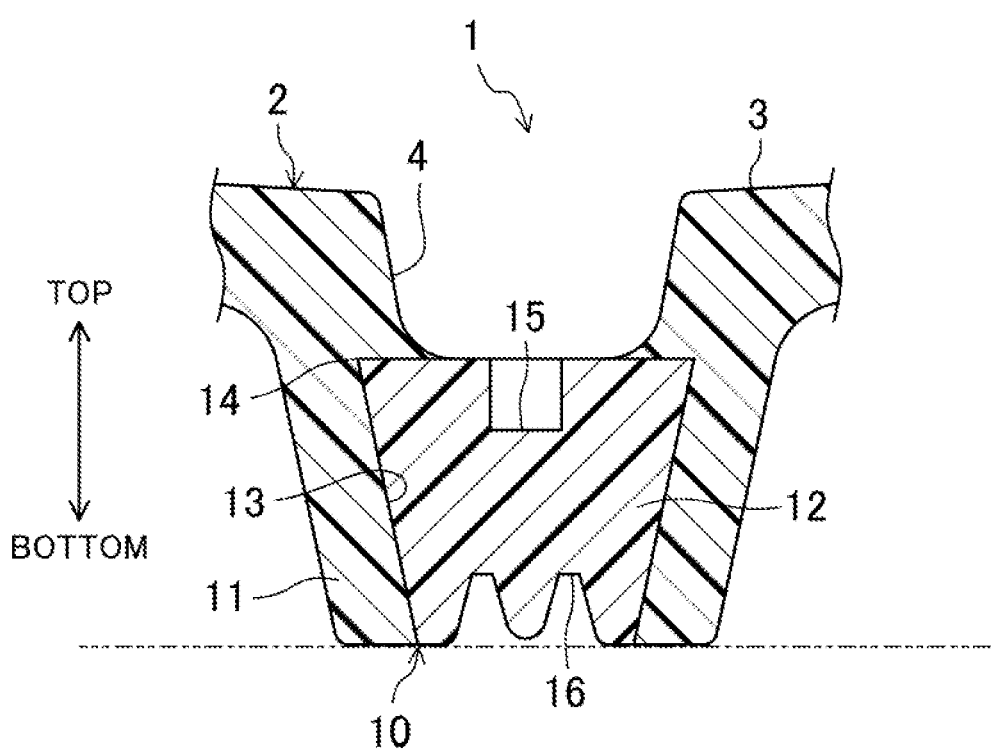
FIG. 9 is a diagram corresponding to FIG. 7, illustrating the configuration of a stud according to a first modification.

The retaining structure is not limited to the specific configuration illustrated in the above embodiment, and various configurations can be used for the retaining structure. For example, the above embodiment illustrates the form in which the inner hole 13 of the outer tubular portion 11 and the core portion 12 have a substantially barrel shape in vertical section. However, the present disclosure is not limited to this form. As in a first modification shown in FIG. 9, the inner hole 13 and the core portion 12 may have a tapered shape in vertical section, and the core portion 12 may have the corner 14 at its upper end. In this modification as well, the core portion 12 can be restrained from slipping out of the outer tubular portion 11 both upward and downward.

Figure 10:
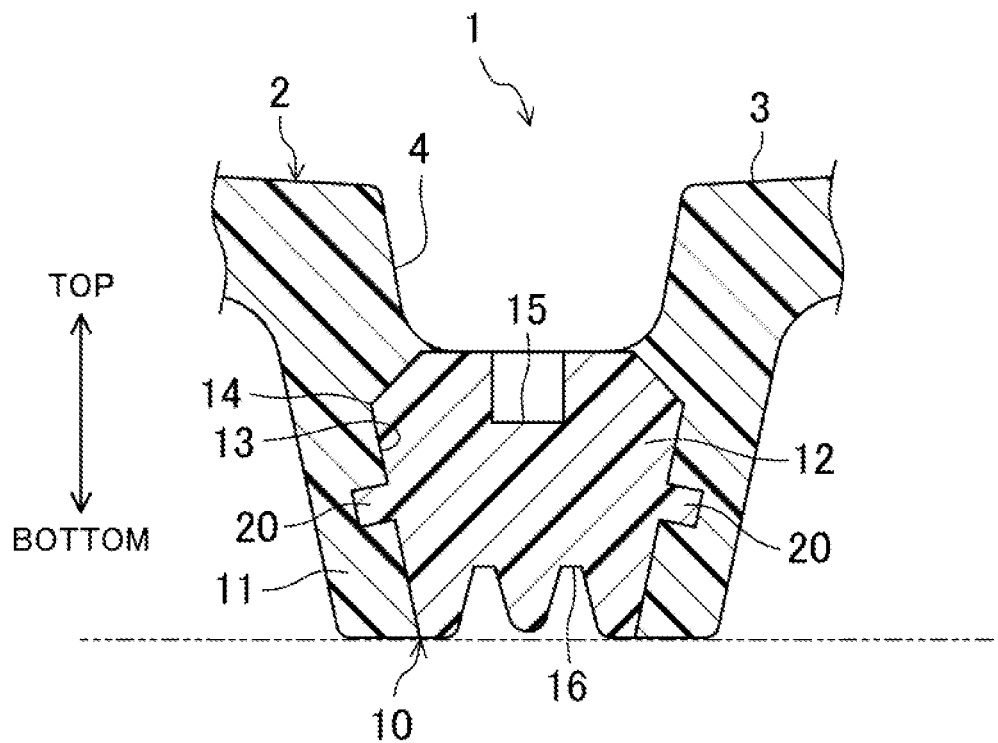
FIG. 10 is a diagram corresponding to FIG. 7, illustrating the configuration of a stud according to a second modification.

As in a second modification shown in FIG. 10, the core portion 12 may have a protruding portion 20. The protruding portion 20 protrudes radially outward from the outer peripheral surface of the core portion 12. The protruding portion 20 has a substantially rectangular shape in section. The protruding portion 20 is located below the corner 14 in the vertical direction of the core portion 12. Due to this protruding portion 20, the core portion 12 is less likely to slip out of the outer tubular portion 11 both upward and downward. That is, in the second modification, the corner 14 and the protruding portion 20 serve as the retaining structure.

Figure 11:
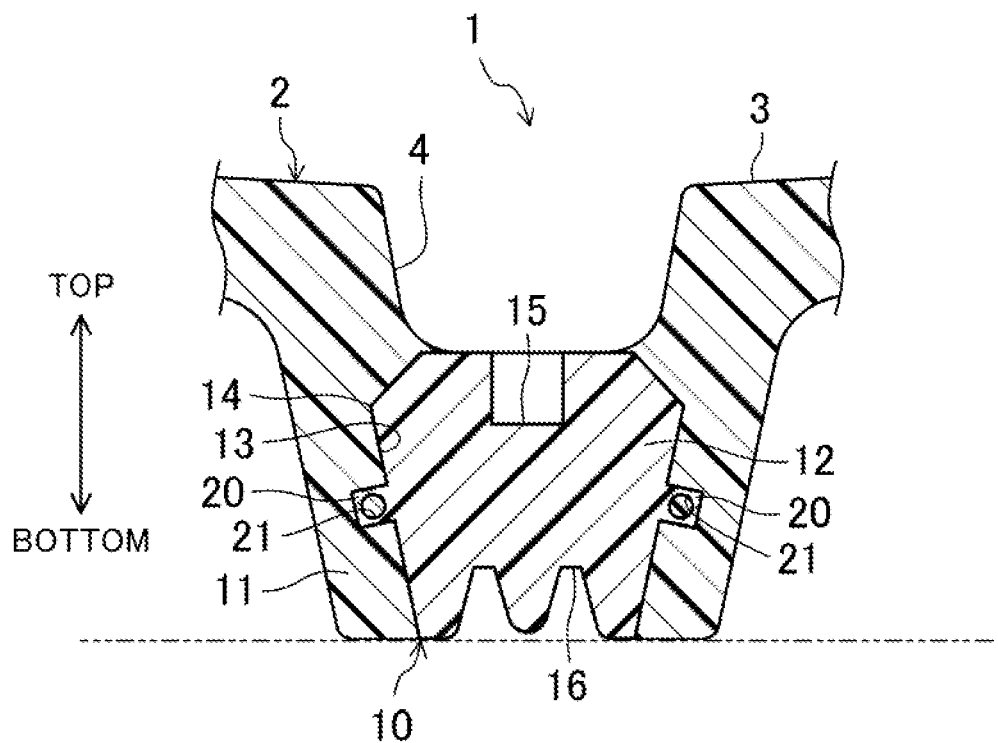
FIG. 11 is a diagram corresponding to FIG. 7, illustrating the configuration of a stud according to a third modification.

As in a third modification shown in FIG. 11, the protruding portion 20 may have a through hole 21. The through hole 21 extends through the protruding portion 20 in a direction orthogonal to the direction in which the protruding portion 20 extends. Part of the outer tubular portion 11 is located in the through hole 21. That is, in this modification, the injection molding process is performed so that the through hole 21 is filled with the resin material for the outer tubular portion 11. In this modification as well, the core portion 12 is less likely to slip out of the outer tubular portion 11 both upward and downward.

Figure 12:
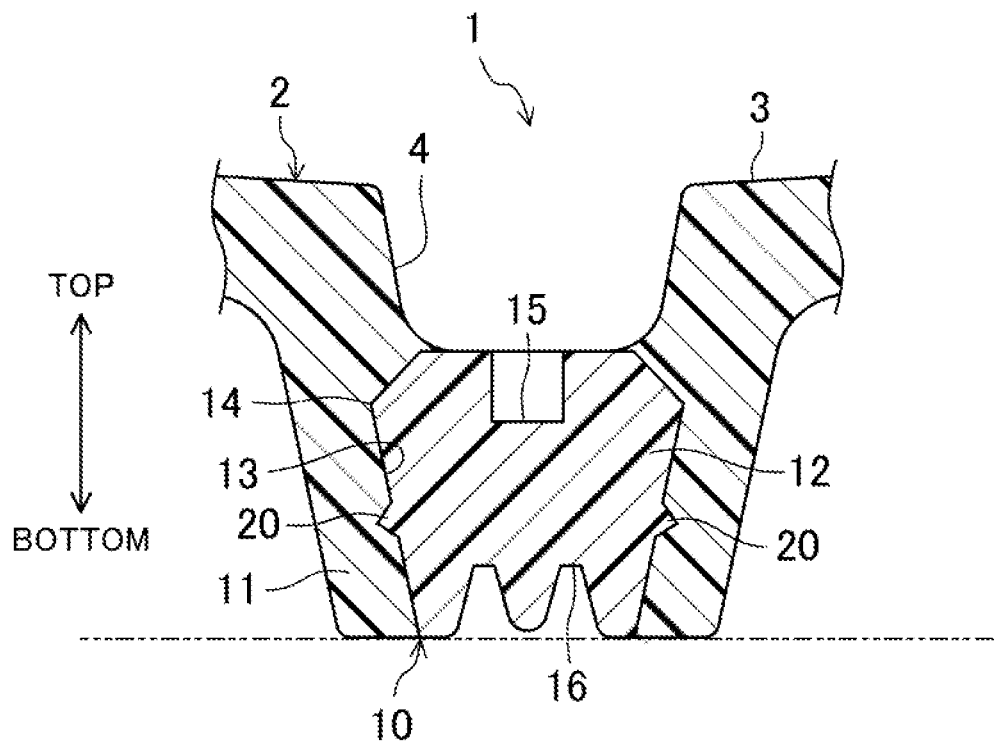
FIG. 12 is a diagram corresponding to FIG. 7, illustrating the configuration of a stud according to a fourth modification.

As in a fourth modification shown in FIG. 12, the protruding portion 20 of the second modification may have a substantially triangular shape in section. In this modification as well, the core portion 12 is less likely to slip out of the outer tubular portion 11 both upward and downward, as in the second modification.

The core portion 12 of the above embodiment has the largest radial size at the position of the corner 14. However, the present disclosure is not limited to this form. For example, as in a fifth modification shown in FIG. 13, the core portion 12 may have the smallest radial size at the position of the corner 14. In this modification, since the inner wall surface of the outer tubular portion 11 is stopped by the corner 14, the core portion 12 is less likely to slip out of the outer tubular portion 11 both upward and downward.

Figure 13:
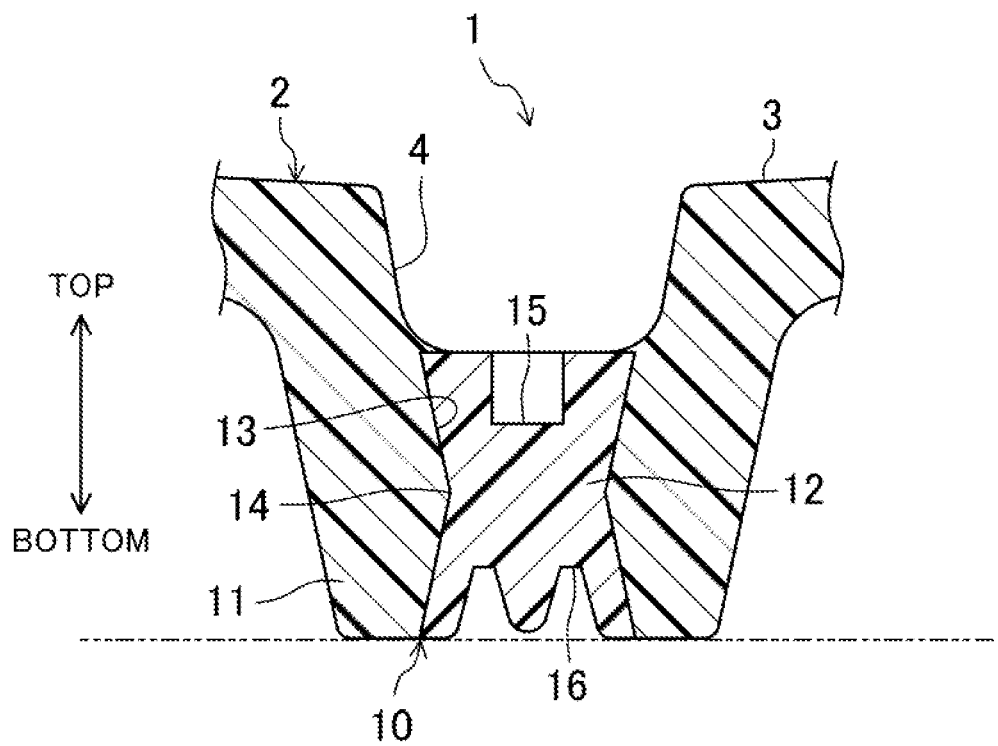
FIG. 13 is a diagram corresponding to FIG. 7, illustrating the configuration of a stud according to a fifth modification.

In the fifth modification shown in FIG. 13, the outer tubular portion 11 has the smallest thickness at its lower end. With such a configuration, when forming the outer tubular portion 11 by injection molding, the heated and melted resin material can more easily flow toward the lower end of the outer tubular portion 11 in the mold device 30. As a result, molding defects such as sink marks are less likely to occur in the outer tubular portion 11, and the outer tubular portion 11 becomes structurally stable.

Figure 14:
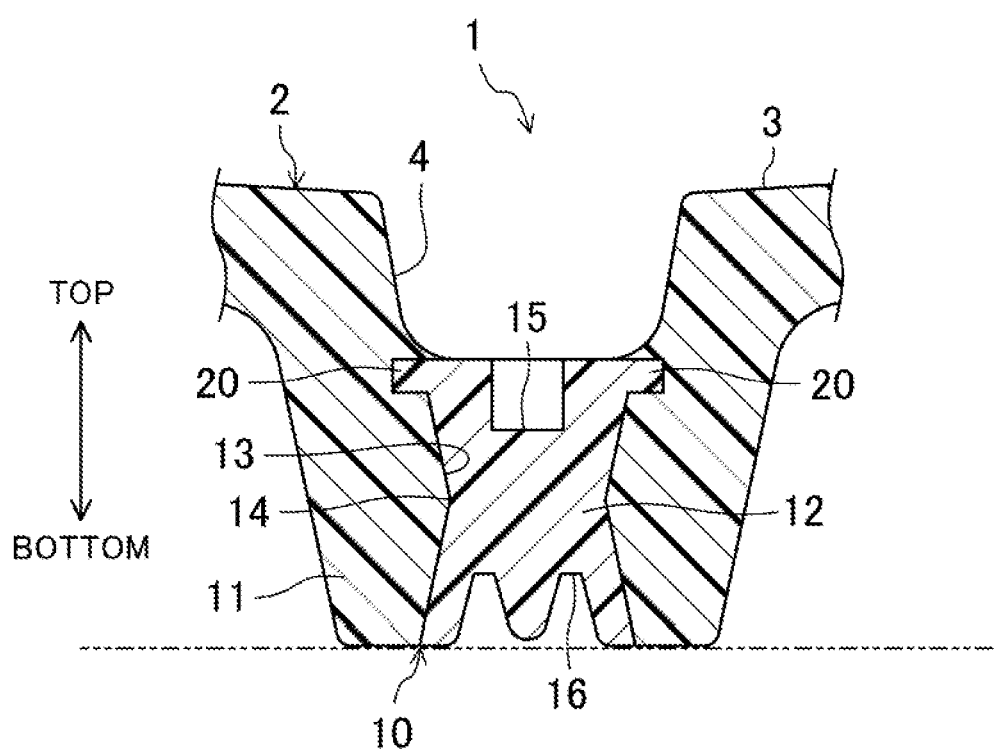
FIG. 14 is a diagram corresponding to FIG. 7, illustrating the configuration of a stud according to a sixth modification.

As in a sixth modification shown in FIG. 14, the core portion 12 of the fifth modification may have the protruding portion 20 at its upper end. In this modification as well, the core portion 12 is less likely to slip out of the outer tubular portion 11 both upward and downward.

As described above, in the first to sixth modifications as well, the core portion 12 is less likely to slip out of the outer tubular portion 11 both upward and downward due to the retaining structure. As a result, the stud 10 becomes stable with respect to the outsole 1.

OTHER EMBODIMENTS

The above embodiment illustrates the form in which the outer tubular portion 11 has a cylindrical shape. However, the present disclosure is not limited to this form. For example, the outer tubular portion 11 may have the shape of a polygonal prism including a triangular prism. Alternatively, the outer tubular portion 11 may have the shape of a blade extending in a predetermined direction.

The above embodiment illustrates the form in which the inner wall surface of the outer tubular portion 11 surrounds the entire side surface of the core portion 12. However, the present disclosure is not limited to this form. Although not shown in the figures, the side surface of the core portion 12 may have a portion that is not surrounded by the inner wall surface of the outer tubular portion 11. That is, the inner wall surface of the outer tubular portion 11 need only be configured to substantially surround the side surface of the core portion 12.

The above embodiment illustrates the form in which the thickness of the outer tubular portion 11 is substantially constant from the position corresponding to the corner 14 to the lower end of the outer tubular portion 11 (see FIG. 7). However, the present disclosure is not limited to this form. For example, although not shown in the figures, the thickness of the outer tubular portion 11 may gradually decrease from the position corresponding to the corner 14 toward the lower end of the outer tubular portion 11. In this configuration as well, the outer tubular portion 11 can be configured to have the smallest thickness at its lower end as in the fifth modification shown in FIG. 13. Accordingly, as in the fifth modification, molding defects such as sink marks are less likely to occur in the outer tubular portion 11, and the outer tubular portion 11 becomes structurally stable.

In the above embodiment, a resin material is used as the material for the core portion 12. However, the material for the core portion 12 is not limited to the resin material. Materials other than the resin material (metal material, ceramic material, etc.) may be used as the material for the core portion 12.

Although the embodiments of the present disclosure are described above, the present disclosure is not limited to the above embodiments, and various modifications can be made without departing from the spirit and scope of the disclosure.

The present disclosure is industrially applicable as a stud for an outsole for a cleated shoe, an outsole, a method for producing an outsole, and a cleated shoe.

What is claimed is:

1. A stud for an outsole for a cleated shoe, comprising:
an outer tubular portion located on the outsole and having a tubular shape; and
a core portion located inside the outer tubular portion and extending in the same direction of the outer tubular portion, wherein;
the outer tubular portion is integral with the outsole with no seam between the outer tubular portion and the outsole,
an inner wall surface of the outer tubular portion surrounds, and is in contact with, a side surface of the core portion,
the core portion comprises at least one corner configured to correspond to a retaining structure that restrains the core portion from slipping out of the tubular portion, and
a radial size of the core portion is the largest at the corner, such that the radial size of the core portion gradually decreases in a direction upward and in a direction downward relative to the corner.

2. The stud of claim 1, wherein
each of the outer tubular portion and the core portion is made of a resin material, and
the inner wall surface of the outer tubular portion and the side surface of the core portion are fused to each other.

3. The stud of claim 1, wherein
the outer tubular portion has a smallest thickness at its lower end.

4. The stud of claim 1, wherein
a lower end of the core portion is exposed from a lower end of the outer tubular portion.

5. The stud of claim 1, wherein
the core portion includes a mold installation structure that is used to place the core portion in a mold device for producing the outsole, and
the mold installation structure includes
a first recess located in an upper part of the core portion, and
a second recess located in a lower part of the core portion.

6. An outsole for a cleated shoe, comprising at least one of the studs of claim 1.

7. The outsole of claim 6, further comprising an outsole body, wherein
the stud is located on a bottom of the outsole body, and
the outer tubular portion is integral with the outsole body with no seam between the outer tubular portion and the outsole body.

8. A cleated shoe, comprising the outsole of claim 6.

9. A cleated shoe, comprising the outsole of claim 7.

* * * * *